United States Patent [19]
Watanabe et al.

[11] Patent Number: 5,298,994
[45] Date of Patent: Mar. 29, 1994

[54] TELEVISION SIGNAL CONVERTER FOR CONVERTING HIGH DEFINITION TELEVISION (HDTV) SIGNALS TO CONVENTIONAL TELEVISION SIGNALS

[75] Inventors: Kohei Watanabe, Tokyo; Takato Katagiri, Saitama, both of Japan

[73] Assignee: Kabushiki Kaisha Toshiba, Kanagawa, Japan

[21] Appl. No.: 696,247

[22] Filed: May 6, 1991

[30] Foreign Application Priority Data

May 9, 1990 [JP] Japan .................. 2-117452
May 9, 1990 [JP] Japan .................. 2-117453

[51] Int. Cl.⁵ .................. H04N 7/01; H04N 5/46
[52] U.S. Cl. .................. 348/445; 348/704; 348/578
[58] Field of Search .................. 358/11, 12, 180, 183, 358/22, 140, 141; H04N 7/01, 5/44, 5/45, 5/46

[56] References Cited

U.S. PATENT DOCUMENTS

| | | | |
|---|---|---|---|
| 4,943,856 | 7/1990 | Bakhmutsky | 358/140 |
| 4,984,081 | 1/1991 | Miyoshi et al. | 358/140 |
| 5,070,395 | 12/1991 | Kitaura et al. | 318/11 |

FOREIGN PATENT DOCUMENTS

| | | | |
|---|---|---|---|
| 1-212970 | 8/1989 | Japan . | |
| 303286 | 12/1990 | Japan | H04N 7/01 |
| 305190 | 12/1990 | Japan | H04N 7/01 |
| 226192 | 7/1991 | Japan | H04N 7/01 |

Primary Examiner—James J. Groody
Assistant Examiner—Glenton B. Burgess
Attorney, Agent, or Firm—Banner, Birch, McKie & Beckett

[57] ABSTRACT

A converter for television signals formed of a television signal converter, a selection position changer and a position display. The television signal converter converts a first television signal corresponding to a selected portion of a picture of a first television system to a second television signal of a second television system so that the selected portion of the picture of the first television system fills the entire screen of the second television system. The aspect ratios of the first and second television system are different. The selection position changer changes the position of the selected portion of the picture of the first television system. The position display displays information about the position of the selected portion of the picture of the first television system.

12 Claims, 5 Drawing Sheets

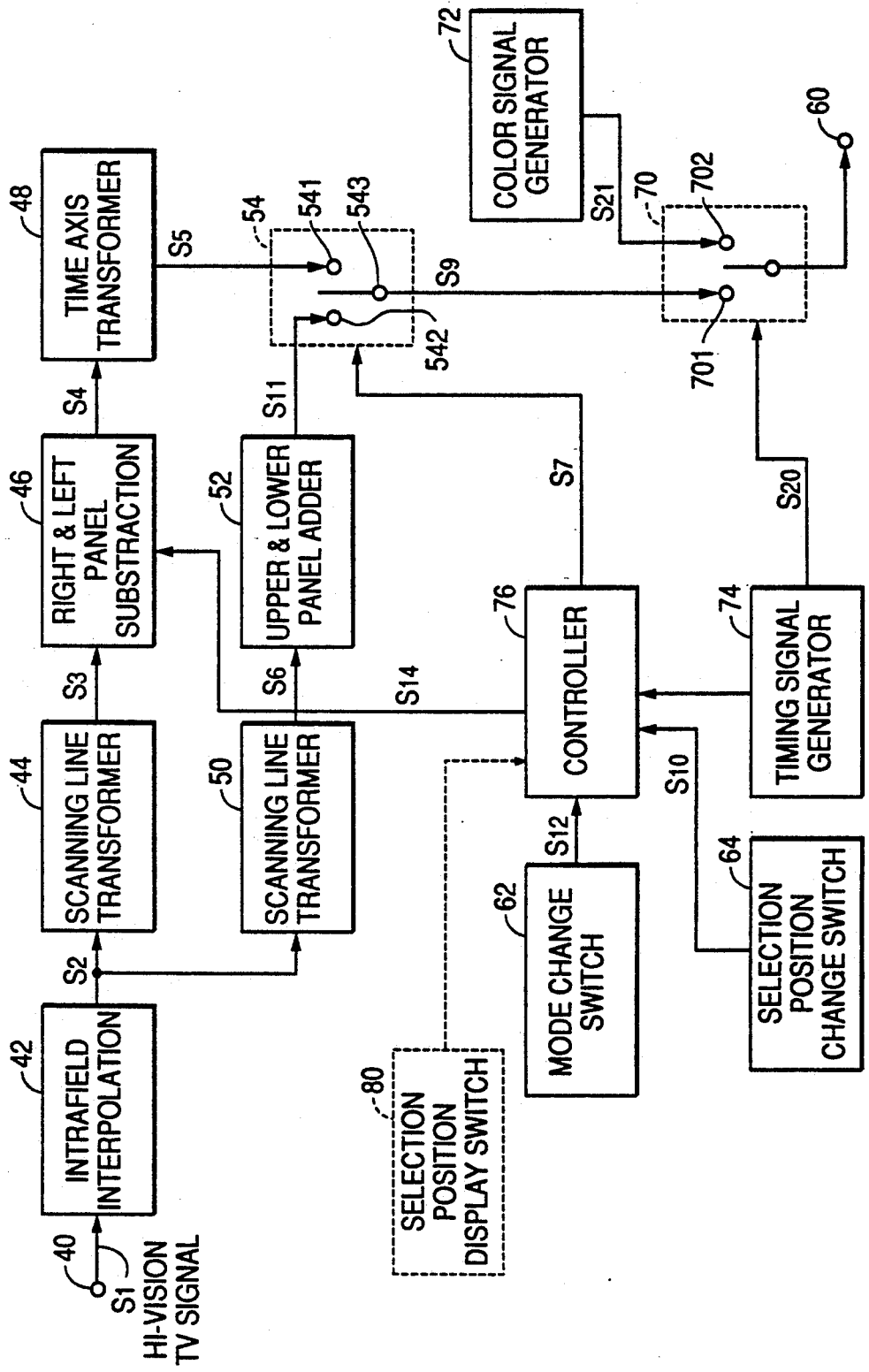

X:Y = 4:3
A:B = 16:9

TELEVISION SIGNAL CONVERTER FOR CONVERTING HIGH DEFINITION TELEVISION (HDTV) SIGNALS TO CONVENTIONAL TELEVISION SIGNALS

BACKGROUND OF THE INVENTION

1. Field of the Invention

The present invention relates to the field of television signal conversion and, in particular, is directed to a converter which converts a first television signal in a first television system to a second television signal for use in a second television system, wherein the second television signal has a different aspect ratio than the first television signal.

2. Description of the Related Art

Various high definition television (HDTV) systems having different aspect ratios than the aspect ratios in conventional television systems are presently being proposed. One such system is known as the Hi-Vision system and has an aspect ratio of 16:9 compared to the 4:3 aspect ratio in a conventional system. A signal converter is thus required in order to watch a Hi-Vision program on a conventional television.

Such converters normally provide wide and zoom modes of display when a Hi-Vision program is displayed on a conventional receiver.

In the zoom mode, a portion of the picture area of the Hi-Vision picture fills the entire receiver screen.

FIG. 1 illustrates a Hi-Vision picture 22 displayed on a Hi-Vision system television screen. Picture 22 having an aspect ratio of 16:19 (A:B=16:9) is formed of zoom portion 20 and side portions 101 and 102. When Hi-Vision picture 22 is displayed on a conventional television receiver in the zoom mode, portion 20 is converted to fill the entire picture screen. In the wide mode of operation, the full Hi-Vision picture, i.e., portion 20 and side portions 101 and 102 are converted to fill a conventional receiver screen. The wide mode will be described in more detail with reference to FIG. 2.

FIG. 2 illustrates a picture 32 displayed on a conventional television receiver. Picture 32 is formed of portion 30 and upper and lower portions 201 and 202. Portion 30 corresponds to a full Hi-Vision picture. In the wide mode, all portions of the Hi-Vision picture 22 having an aspect ratio of 16:9 are displayed, for example, in the center area of the screen with an aspect ratio of 4:3.

In the zoom mode, the screen position of a portion 20 taken from Hi-Vision picture 22 can be freely selected. That is, as shown in FIG. 3, the position of selected portion 34 of a Hi-Vision picture 36 is located to the right of the screen rather than the center. When portion 34 is displayed on a conventional television receiver, there is no indication provided to the user with respect to the selected position from which portion 34 was taken from the Hi-Vision picture. Such an indication would, of course, be useful to the user as it would enable the user to have more effective control over the conversion and display process for the Hi-Vision picture. Accordingly, prior art converters are deficient in this regard.

SUMMARY OF THE INVENTION

Accordingly, it is an overall object of the present invention to provide an improved converter for television picture signals which provides information about the relative screen position of a selected portion of the television picture.

It is a specific object of the present invention to provide such a converter which is easy to implement and reliable in operation.

It is another specific object of the present invention to provide such a converter which is low in cost and can be readily operated by a user.

In accordance with the present invention, the foregoing objects are achieved by providing a converter for television picture signals which comprises a conversion device for converting a first television signal corresponding to a selected portion of a television picture of a first television system to a second television signal of a second television system so that the selected portion of the picture of the first television system fills the entire screen of the second television system which has an aspect ratio which is different from the aspect ratio of the first television system. A selection position change device is provided for changing the position of the selected portion of the picture of the first television system. A position display device also is provided for displaying information about the position of the selected portion of the picture of the first television system.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which:

FIG. 8 is a block diagram of another embodiment of a converter for television signals according to the present invention.

DETAILED DESCRIPTION OF THE PREFERRED EMBODIMENT

Figure 4:
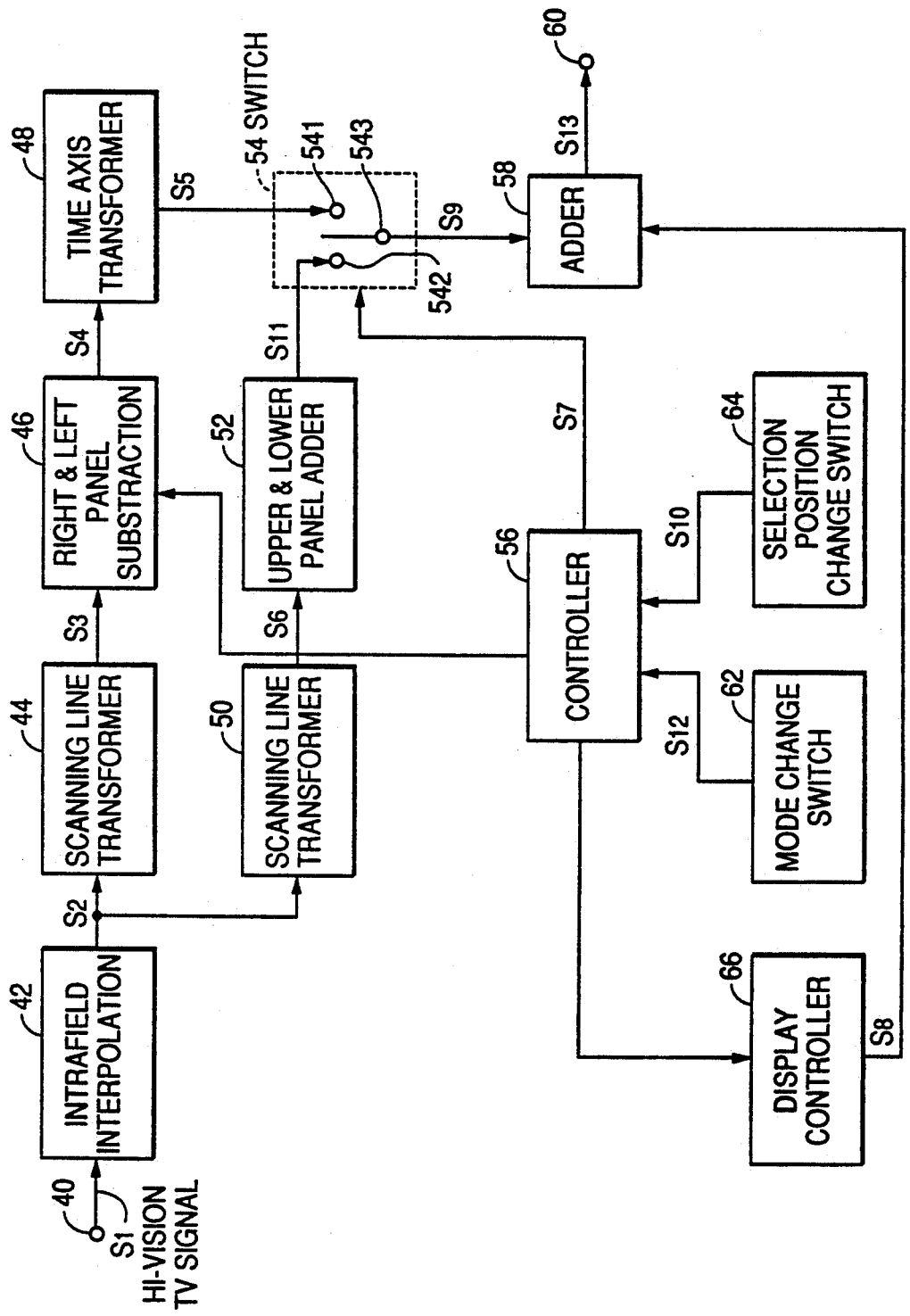
FIG. 4 is a block diagram of a converter for television signals according to the present invention.

A preferred embodiment of the present invention will now be described in more detail with reference to the accompanying drawings. FIG. 4 is a block diagram of a converter for television signals according to the present invention.

An input terminal 40 receives a Hi-Vision television signal S1. The bandwidth of Hi-Vision signal S1 is compressed using a subsampling transmission scheme such as the multiple Sub-Nyquist-Sampling Encoding system (MUSE). An intrafield interpolation circuit 42 is connected to input terminal 40 and receives signal S1. Intrafield interpolation circuit 42 interpolates each field of the television signal using a sampling process to produce an original Hi-Vision signal S2.

Figure 1:
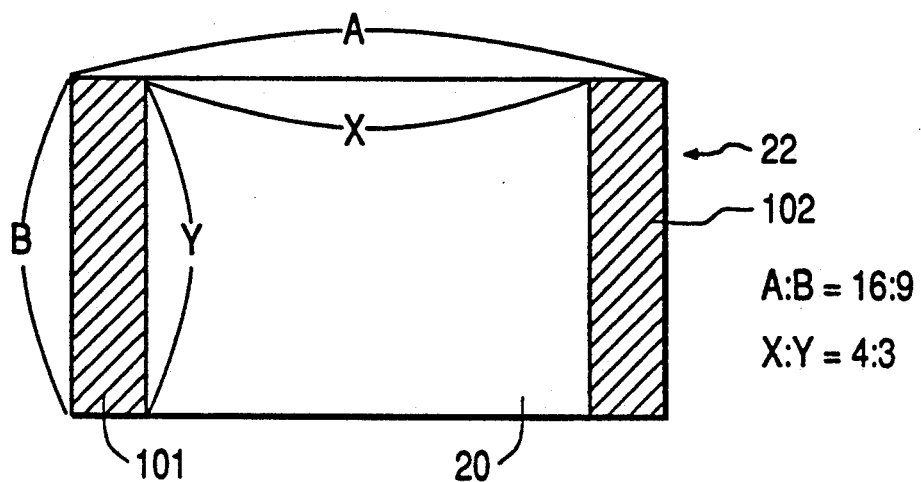
FIG. 1 illustrates a picture in a Hi-Vision system.

A scanning line transformer 44 is connected to intrafield interpolation circuit 42. Scanning line transformer 44 transforms Hi-Vision signal S2 having 1125 lines from intrafield interpolation circuit 42 to a conventional TV signal S3 having 525 lines. A right and left panel substraction circuit 46 is connected to scanning line transformer 44. Right and left panel substraction circuit 46 reduces the signal in a manner which corresponds to right and left panels 101 and 102 (see FIG. 1) from output signal S3 of scanning line transformer 44. Substraction circuit 46 passes the portion of the signal which corresponds to portion 20 having an aspect ratio of 4:3 (see FIG. 1). This signal reduction operation is implemented by using a switch circuit (not shown) controlled by timing signals as described below. A time axis transformer 48 is connected to right and left panels substraction circuit 46. Time axis transformer 48 transforms the time axis of output signal S4 from right and left panel substraction circuit 46 in order to produce a conventional television (TV) signal S5.

Figure 2:
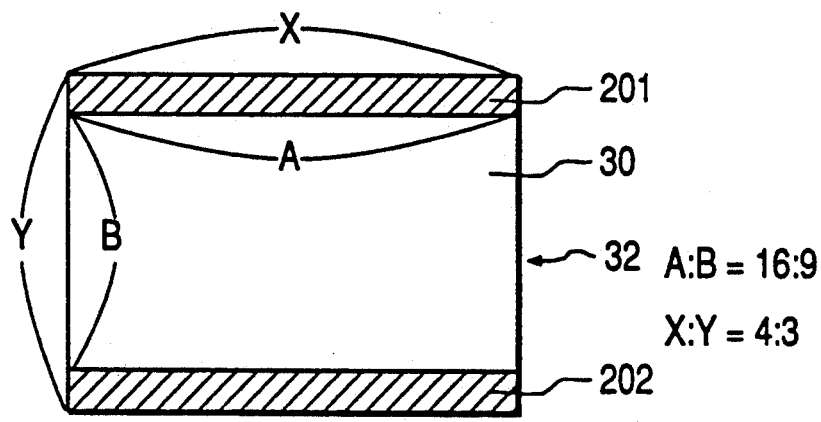
FIG. 2 illustrates a picture in a conventional television system.
Figure 3:
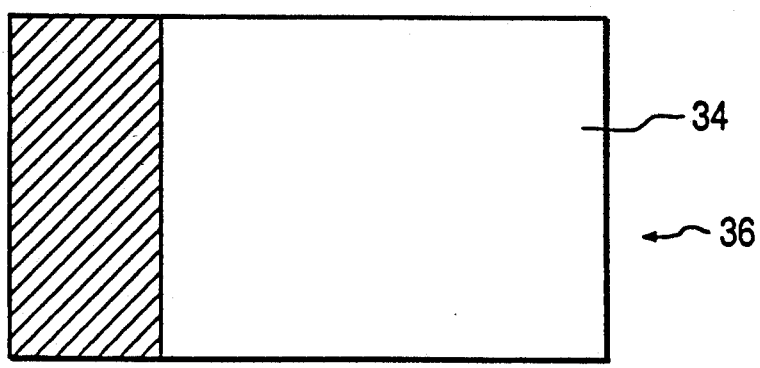
FIG. 3 illustrates another picture in a Hi-Vision system.

A scanning line transformer 50 is also connected to intrafield interpolation circuit 42. Scanning line transformer 50 transforms Hi-Vision signal S2 having 1125 lines from intrafield interpolation circuit 42 to signal S6 having a number of lines (for example, 375 lines) which correspond to portion 30 of the conventional television picture 32 as shown in FIG. 2.

An upper and lower panel adder circuit 52 is connected to scanning line transformer 50. Upper and lower panel adder circuit 52 adds signals which correspond to portions 201 and 202 (FIG. 2) of conventional TV picture 32. The signals added by upper and lower panel adder circuit 52 include synchronizing signals and constant level signals for the picture portion.

A switch 54 is connected to time axis transformer 48 and upper and lower panel adder circuit 52. Specifically, input terminals 541 and 542 of switch 54 are connected to time axis transformer 48 and upper and lower panel adder circuit 52, respectively. Switch 54 is switched by a control signal S7 from a controller 56 as described below.

An adder 58 is connected to an output terminal 543 of switch 54. Adder 58 also provides output terminal 60.

Mode change switch 62 and selection position change switch 64 are connected to controller 56. Switches 62 and 64 are provided for switching between a wide and zoom mode as the signal transformation mode and for moving the position of a picture portion taken out of the Hi-Vision picture (selection position), respectively.

A display controller 66 is also connected to controller 56. Display controller 66 comprises a character generator which functions to display within the picture whether the transformation mode is wide or zoom. Display controller 66 also functions to display within the picture whether the selection position is the center portion of the picture (standard position) in the zoom mode. These functions are controlled by controller 56 according to the transformation mode designated by switch 62 and the selection position designated by switch 64.

An output terminal of display controller 66 is connected to the other input terminal of adder 58. Adder 58 adds output S8 from display controller 66 to output S9 from switch 54.

Controller 56 controls right and left panel substraction circuit 46, switch 54 and display controller 66. More specifically, substracting the right and left panels in right and left panel substraction circuit 46 is implemented by an output S10 from switch 64 through controller 56. Switch 54 is connected to terminals 541 and 542 by controller 56 in the zoom and wide modes, respectively.

The operation of the embodiment of the present invention shown in FIG. 4 will now be described.

Each field in band-compressed Hi-Vision signal S1 input from input terminal 40 is interpolated to produce Hi-Vision signal S2. Hi-Vision signal S2 having 1,125 lines is transformed to a corresponding signal having only 525 lines as in a conventional TV signal by removing lines using scanning line transformer 44. The TV signals which correspond to the right and left panels of the picture under signal S3 is then substracted by right and left panel substracting circuit 46. Substraction is implemented by output signal S10 from switch 64 through controller 56.

The time axis of output signal S4 from right and left panel substraction circuit 46 is transformed by time axis transformer 48 to form a conventional TV signal S5.

Output signal S2 from intrafield interpolation circuit 42 is also transformed to signal S6 with the number of lines corresponding to portion 30 (FIG. 2) of conventional TV picture 32 by scanning line transformer 50. Signals which correspond to portions 201, 202 (FIG. 2) of picture 32 are added to signal S6 by upper and lower panel adder circuit 52 to form signal S11.

Figure 5:
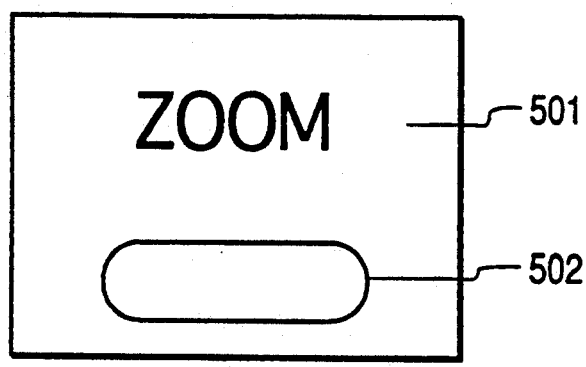
FIGS. 5 through 7 illustrate pictures of a conventional television system provided by the converter shown in FIG. 4.

If the user selects the zoom mode using switch 62, switch 54 is connected to terminal 541 by controller 56. Thus, signal S5 is selected by switch 54 and is output to adder 60. From display controller 66, a signal corresponding to the characters 'ZOOM' 501 (FIG. 5) is output from output S12 of switch 62 through controller 56 and is added to output signal S9 from switch 54 by adder 58. The picture produced by output signal S13 from adder 58 is, for example, shown in FIG. 5. Additionally, if the user sets the selection position to the center position by switch 64, signals corresponding with a mark area 502 is also output from display controller 66. Otherwise, mark area 502 is not displayed on the picture (signal corresponding with a mark area 502 is not output from display controller 66).

Figure 6:
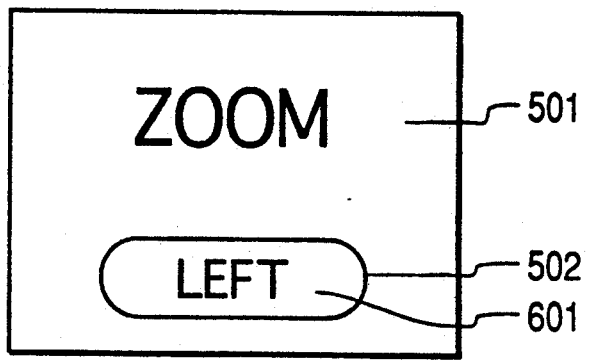

Additionally, and as shown in FIG. 6, characters 601 such as 'CENTER', 'LEFT' or 'RIGHT', may be displayed in mark area 502 according to the output from switch 64. Picture information in the area 502 may be removed in order to avoid confusion. Moreover, information about the selection position is not limited to the mark area scheme discussed above.

Figure 7:
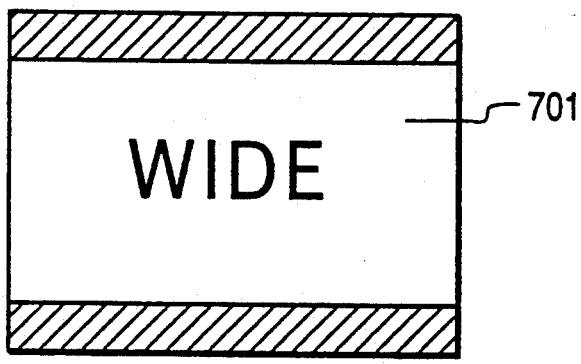

If the user selects the wide mode by switch 62, switch 54 is connected to terminal 542 through controller 56. Thus, signal S11 from upper and lower panel adder circuit 52 is selected by switch 54 and is output to adder 58. Signals corresponding to the characters 'WIDE' 701 (FIG. 7) are output from display controller 66 by the output of switch 62 through controller 56 and are added to signal S9 from switch 54. A picture produced by output signal S13 from adder 58 is, for example, shown in FIG. 7.

In the above embodiment, zoom and wide modes are described. However, the converter for television signals in accordance with the present invention may have only the zoom mode. As also described in the above embodiment, a television signal is transformed from the Hi-Vision to a conventional TV signal. However, inverse transformation also may be applied.

FIG. 8 is a block diagram of another embodiment of a converter for television signals according to the present invention. Where, in the drawings, the same numerals are applied to similar elements, the detailed descriptions thereof are not repeated.

The difference between the first and second embodiments is that the second embodiment further includes a switch 70, a color signal generator 72 and a timing signal generator 74.

This second embodiment does not include display controller 66. A controller 76 replaces controller 56 and includes more functions than controller 56 described above with reference to FIG. 4. That is, input terminals 701, 702 of switch 70 are connected to output terminal 543 of switch 54 and color signal generator 72. Switch 80 is controlled by output signal S20 from timing signal generator 74.

Switch 70 selects and outputs S9 of switch 54 or an output signal S21 of color signal generator 72 by timing signal S20 from timing signal generator 74. Color signal generator 72 generates signal S21 corresponding to a predetermined color. Controller 76 changes the connecting of switch 54 from terminal 541 to 542 if switch 64 is operated while in the zoom mode. Simultaneously, controller 76 activates timing signal generator 74 and supplies information about the selection position from switch 64. Timing signal generator 74 outputs timing signal S20 corresponding to the selection position. The connection of switch 70 is changed to terminal 702 from 701 when timing signal S20 is generated from timing signal generator 74.

The operation of the second embodiment is described below with reference to FIGS. 9 and 10.

Figure 9:
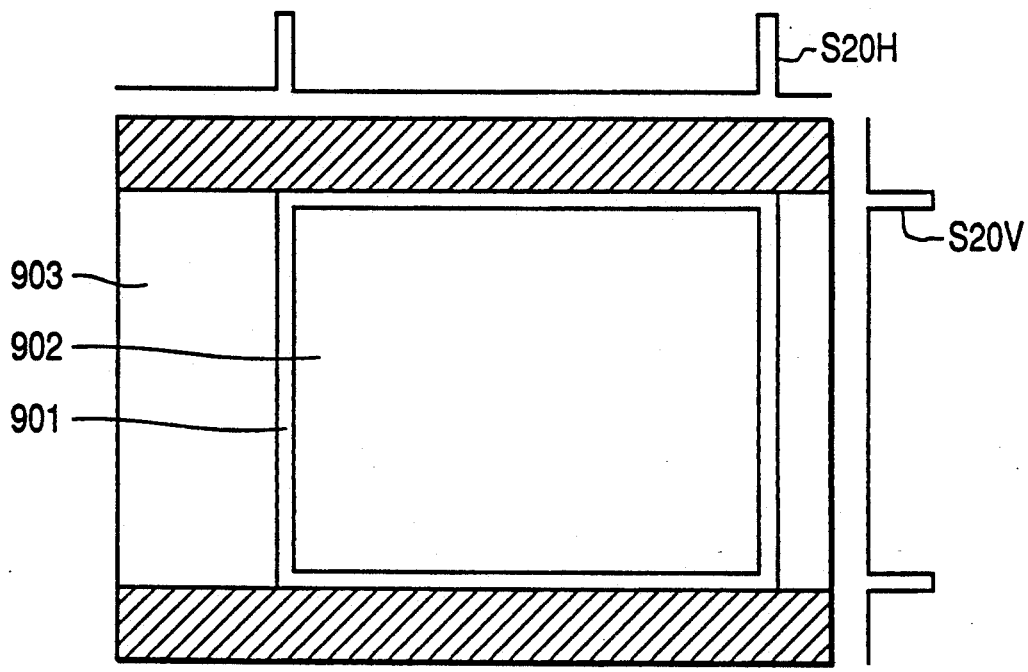
FIG. 9 illustrates pictures in a conventional television system according to the converter shown in FIG. 8.
Figure 10:
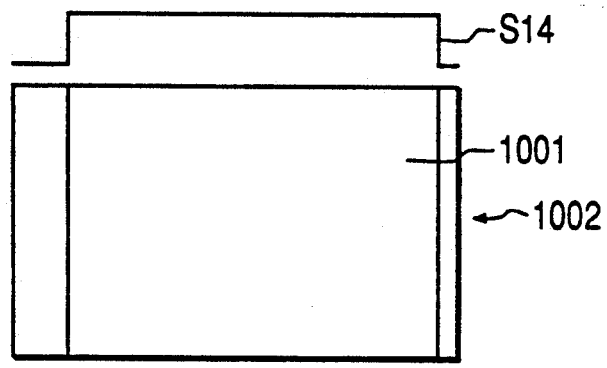
FIG. 10 illustrates a picture of a Hi-Vision system showing the selection portion illustrated in FIG. 9.

FIGS. 9 and 10 illustrates pictures in a conventional TV system according to the converter shown in FIG. 8 and a Hi-Vision system, respectively.

Where the system is set to the zoom mode, signal S5 is selected by switch 54. Signal S5 is supplied to output terminal 60 through switch 70. Thus, portion 20 of Hi-Vision picture 22 (FIG. 1) is fully displayed on the TV monitor (not shown).

If switch 64 is operated during the zoom mode, the connection of switch 54 is changed from terminal 541 to terminal 542 to select signal S11 from upper and lower panel adder circuit 52. According to the selection position determined by switch 64, the phase of timing signal S20 is changed. Thus, the picture is displayed according to the selected position.

Timing signal generator 74 is activated by controller 76 and information about the selection position is supplied to timing signal generator 74 from controller 76. Timing signal generator 74 changes the phase of timing signal S20 according to the new selection position.

Signal S11 from upper and lower panel adder circuit 52 is provided to output terminal 60 through switches 54 and 70. The picture on the display shows all of the Hi-Vision picture information in this case. Additionally, the selection position is displayed on the Hi-Vision picture. More particularly, as shown in FIG. 9, the position is displayed by color frame 901. Picture 902 surrounded by frame 901 corresponding to a portion 1001 of original Hi-Vision picture 1002 (FIG. 10) where, S14 is a output from controller 76 to right and left panel substraction circuit 46. Portion 903 corresponds with original Hi-Vision picture 1002.

Frame 901 is displayed by switching the output of switch 70 from signal S9 to signal 521. Thus, if timing signal S20 is separated to a horizontal and vertical direction, timing signal is shown as S20H, (S20V in FIG. 9). Actually, horizontal and vertical timing signals are supplied according to the TV monitor's scanning frequency. Frame 901 is displayed in a color determined by color signal generator 72. The phase of vertical timing signal S20V is fixed while the phase of horizontal timing signal S20H is controlled or determined by the selection position.

If the user stops the operation of switch 64, the connection of switch 54 is changed to the last connection state, i.e., signal S5 in the zoom mode is output. The operation of timing signal generator 74 is prevented by controller 76. Thus, timing signals are not generated. The picture in the zoom mode is displayed without display of frame 901.

According to the second embodiment of the present invention, selection position is displayed when the selection position is changed by the user. The user may thus confirm the changed selection position visually. In this embodiment, the selection position is displayed by using the transformation output in the wide mode. Thus, in an apparatus including the wide transformation mode, a new transformation circuit (converter) is not required.

The above embodiment displays the selection position only when the selection position is changed by the user. However, a converter may display the selection position on demand by the user. For example, a selection position display switch 80 is further provided (FIG. 8) and controller 76 controls timing signal generator 74 and switch 54 as well as when switch 64 is operated. Information with respect to the selection position may be supplied from switch 164.

Figure 11:
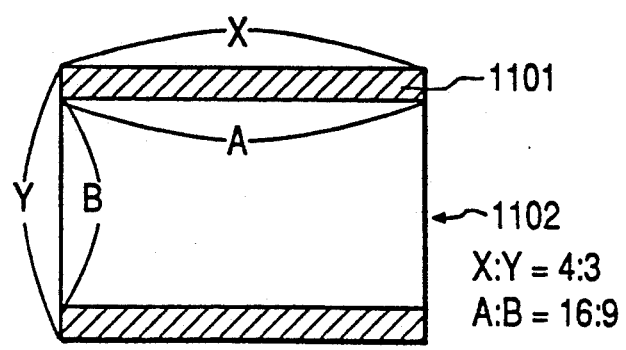
FIG. 11 illustrates a picture in a conventional TV system according to a third embodiment of the present invention.

The converter may display a selection position which is predetermined in the state that the wide mode is set yet. Also, in this embodiment, signal is transformed from the Hi-Vision signal to a conventional TV signal. However, the reverse process may also be performed. That as shown in FIG. 11, portion 1101 of picture 1102 of a conventional TV system is converted in full to a Hi-Vision system picture.

The present invention is not limited to converters which converts Hi-Vision signal to the present TV signal. The invention also may be applied to converters which convert one signal to another signal where aspect ratios of both signals are different from each other.

What is claimed is:

1. A converter for television signals, said converter comprising:
    television signal conversion means for converting a first television signal corresponding to a selected portion of a television picture of a first television system to a second television signal of a second television system, wherein said selected portion of said television picture becomes a full picture on said second television system having an aspect ratio which is different from the aspect ratio of said first television system;

selection position change means for changing the position of said selected portion of the picture of the first television system; and position display means for displaying textual information about the position of the selected portion of the picture of the first television system on said second television system.

2. A converter for television signals as claimed in claim 1, wherein the position display means displays information about the position of the selected portion of the picture of the first television system in response to a request for displaying the position of the selected part of the picture.

3. A converter for television signals as claimed in claim 2, wherein the request for displaying the position of the selected portion of the picture is output automatically in response to an operation of changing the position of the selected portion of the picture of the first television system in the selection position change means.

4. A converter for television signals as claimed in claim 1, wherein the position display means displays whether the position of the selected portion of the picture is predetermined position or not.

5. A converter for television signals as claimed in claim 1, further comprising a second television signal conversion means for converting a third television signal corresponding to a full said first television system to a fourth television signal corresponding to a portion of the picture of said second television system where said full picture of said first television system becomes a portion of said picture of said second television system.

6. A converter for television signals as claimed in claim 5, wherein the position display means displays information about the position of the selected portion of the picture of the first television system on a display picture under an output of the second television system conversion means.

7. A converter for television signals as claimed in claim 6, wherein the position display means displays the position of the selected portion of the picture of the first television system by a frame on the display picture.

8. A converter for television signals as claimed in claim 6, further comprising a picture display change means for changing picture display from a display picture under an output of the first television signal conversion means to that of the second television signal conversion means in response to the change of the selected portion of the picture of the first television system.

9. A converter for television signals as claimed in claim 6, further comprising a picture display change means for changing picture display from a display picture under an output of the first television signal conversion means to that of the second television signal conversion means in response to a request for displaying the position of the selected portion of the picture of the first television system.

10. A converter for television signals as claimed in claim 5, wherein the first television system has greater aspect ratio than that of the second television system.

11. A converter for television signals as claimed in claim 1, wherein the first television system has greater aspect ratio than that of the second television system.

12. A converter for television signal as claimed in claim 11, wherein the first and second television system have the aspect rations of 16:9 and 4:3, respectively.

* * * * *